United States Patent
Paffenholz

[19]

[11] Patent Number: 6,141,623
[45] Date of Patent: Oct. 31, 2000

[54] METHOD OF DERIVING WATER BOTTOM REFLECTIVITIES IN THE PRESENCE OF GEOLOGIC INTERFERENCE

[75] Inventor: Josef Paffenholz, Missouri City, Tex.

[73] Assignee: Baker Hughes Incorporated, Houston, Tex.

[21] Appl. No.: 09/306,122

[22] Filed: May 6, 1999

[51] Int. Cl.[7] .................................................. G01V 1/38
[52] U.S. Cl. ................................................ 702/17; 367/24
[58] Field of Search ................................ 367/24; 702/14, 702/17, 18; 181/110, 111, 112

[56] References Cited

U.S. PATENT DOCUMENTS

| | | | |
|---|---|---|---|
| 4,146,871 | 3/1979 | Ruehle | 367/24 |
| 4,234,938 | 11/1980 | Allen et al. | 367/24 |
| 5,396,472 | 3/1995 | Paffenholz | 367/24 |
| 5,524,100 | 6/1996 | Paffenholz | 367/24 |
| 5,963,507 | 10/1999 | Barr et al. | 367/24 |
| 5,991,238 | 11/1999 | Barr | 367/24 |

*Primary Examiner*—Donald E. McElheny, Jr.
*Attorney, Agent, or Firm*—Madan, Mossman & Sriram, P.C.

[57] ABSTRACT

In a marine seismic survey, water bottom travel times are obtained by conventional methods. Near offset seismic data are then dereverberated using a suite of possible water bottom reflection coefficients to give a suite of filtered traces. The water bottom reflectivity that gives the minimum value over the suite of processed traces is determined to give a set of selected reflectivities each of the analysis points within a time window. A weight is determined for each analysis time within the time window, the weight being related to the change in the amplitude of the filtered trace at that sample point over the suite of water bottom reflectivities. The selected reflectivities are weighted by the weights and averaged to make a determination of the water bottom reflectivity. This determined water bottom reflectivity is used to process the recorded seismic trace. This determined water bottom velocity may also be used to obtain the upcoming dereverberated wavefield in a dual sensor array wherein a hydrophone-geophone combination is used to record data at the ocean bottom.

16 Claims, 4 Drawing Sheets

METHOD OF DERIVING WATER BOTTOM REFLECTIVITIES IN THE PRESENCE OF GEOLOGIC INTERFERENCE

BACKGROUND OF THE INVENTION

1. Field of the Invention

This invention relates to marine seismic exploration and more particularly to the determination of water bottom reflectivities from recorded seismograms for use in dereverberation of seismic data without adversely damaging reflection sequences that have a periodicity close to that of the two-way travel time in water of seismic waves.

2. Background of the Art

In marine seismic exploration, seismic energy is generated by sources towed behind a vessel. The resultant acoustic pressure waves are reflected from the subsurface formations and recorded as seismograms. Typically, the recorded seismograms include noises that obscure the characteristics of the subsurface formations. These noises include water bottom multiples as depicted in FIG. 2 and reverberations as depicted in FIGS. 3 and 4.

As the initial shot pulse travels to the bottom of the water, it is partially transmitted and partially reflected by the water bottom. The portion that is transmitted is reflected by discontinuities beneath the water to become primary reflections that are important for imaging the subsurface of the earth. The reflected part bounces back to the surface where it is again reflected to the water bottom. Once more, part of this pulse passes through the boundary and part is reflected. The process continues indefinitely. Each time a pulse bounces between the surface and the bottom of the water, a pulse emerges from the boundary at the bottom to follow the initial pulse into the section. These multiple pulses are delayed equal time intervals relative to each other, and their amplitudes are successively reduced by the reflection coefficient at the bottom of the water. A similar process happens with the primary reflections that bounce around in the water layer. The net result of this is to produce a seismogram consisting of a single primary followed by a train of equally spaced multiples or reverberations.

The seismic trace that is generated by a shot pulse may be described mathematically as $$X(t)=S(t)*R(t)*H(t)+N(t) \quad (1)$$

where X(t) is the recorded signal, S(t) is the source signal, R(t) is a reflectivity sequence characterizing the subsurface of the earth, H(t) is a distortion function and N(t) is additive noise. The noise may be coherent or incoherent.

The distortion function that characterizes reverberations is given by the equation $$H_R(t) = \delta(t) + \sum_{k=1}^{\infty} (-r)^k \delta(t - kT) \quad (2)$$

where H R (t) is the revereberation operator, r is the reflection coefficient at the water bottom, δ is the Kronecker delta function, T is the two-way travel time in the water for acoustic waves. In the z-transform domain, the dereverberation operator may be denoted by $$H_D(z) = \frac{1}{(1 + rZ)} \quad (3)$$

In those circumstances wherein the water bottom is relatively flat, the downward-going reverberation distortion at the shotpoint, and the upward-going reverberation distortion at the detector are approximately the same. Consequently, for a flat water bottom, a total dereverberation operator can be represented by the convolution of the two-point operator at the shotpoint with the two-point operator at the detector. This gives the so-called Backus operator $$B(z) = \frac{1}{(1 + rZ)^2} \quad (4)$$

U.S. Pat. No. 3,689,874 to Foster et al. discloses a method for dereverberation of the recorded signal using the autocorrelation of the recorded traces. The method assumes that the autocorrelation of the reflectivity and the noise sequences can be characterized as white noise.

U.S. Pat. No. 4,146,871 to Ruehle discloses a method for dereverberation of recorded signals wherein the dereverberation operator is determined by trying different values for the water bottom reflectivity r and the two-way travel time in the water T and, after the best value is determined from a visual inspection of the processed traces, the air guns in the seismic source are fired sequentially to simulate the dereverberation operator.

Deployment of ocean bottom sensors is frequently used for obtaining 3-D seismic data in an area with obstacles that would hinder the use of towed streamers. Such a situation occurs, for example, when data are being acquired in the proximity of production platforms. With ocean bottom sensors, the "ghost" on the recorded sensor data due to a reflection from the water surface occurs at larger times than it does with streamer data: the streamers being typically at depths of less than 10 meters while the ocean bottom sensors may be at depths of tens or hundreds of meters of water. The multiple sensor arrays include pressure sensors (hydrophones) and vertical component sensors. The latter are usually velocity sensors (geophones). If the water bottom reflectivity is known, the pressure and velocity signals may be combined to give the upcoming field. U.S. Pat. No. 5,524,100 issued to Paffenholz describes an arrangement in which multiple-sensor arrays are deployed on the sea bottom. Pressure and velocity seismic signals are combined, the combined signal is transformed into the frequency domain and multiplied by the inverse Backus operator or the combined signal is convolved with the inverse Backus operator, and an optimization algorithm is used to solve for water bottom reflectivity. Pressure and velocity seismic signals are combined, and the combined signal is multiplied by the inverse Backus operator containing the water bottom reflectivity to eliminate first order peg leg multiples.

One of the problems associated with prior art methods is that the determination of the dereverberation operator may be clouded by geologic reflectivity sequences that have the same time delay as the two-way travel time in water. The processing methods are unable to distinguish between spectral notches caused by reverberations and spectral notches caused by subterranean reflections. Consequently, the derverberation operator will also suppress reflection sequences that have the same time delay as the Backus operator and the resulting processed seismic data will be incorrect in that certain reflections associated with subterranean geology will be suppressed, leading to possible misinterpretations of the data. It would be desirable to have a method of dereverberation of marine seismic data that is robust in the presence of such geologic interference. The present invention satisfies the need.

SUMMARY OF THE INVENTION

The present invention is a method of determination of the water bottom reflectivity that is insensitive to geologic interference, defined here as subterranean reflectors that have time delays close to those in water bottom reverberation. Water bottom travel times are obtained by conventional methods. Near offset seismic data are then dereverberated for a suite of possible water bottom reflection coefficients to give a suite of filtered traces. The water bottom reflectivity that gives the minimum value over the suite of filtered traces is determined to give a set of selected reflectivities for each of the sample points within a time window. A weight is determined for each time within the time window, the weight being related to the change in the amplitude of the filtered trace at that sample point over the suite of water bottom reflectivities. The selected reflectivities are weighted by the weights to and averaged to make a determination of the water bottom reflectivity. This determined water bottom reflectivity is used to process the recorded seismic trace.

BRIEF DESCRIPTION OF THE DRAWINGS

For a detailed understanding of the present invention, references should be made to the following detailed description of the preferred embodiment, taken in conjunction with the accompanying drawings, in which like elements have been given like numerals, wherein.

DETAILED DESCRIPTION OF PREFERRED EMBODIMENTS

Figure 1:
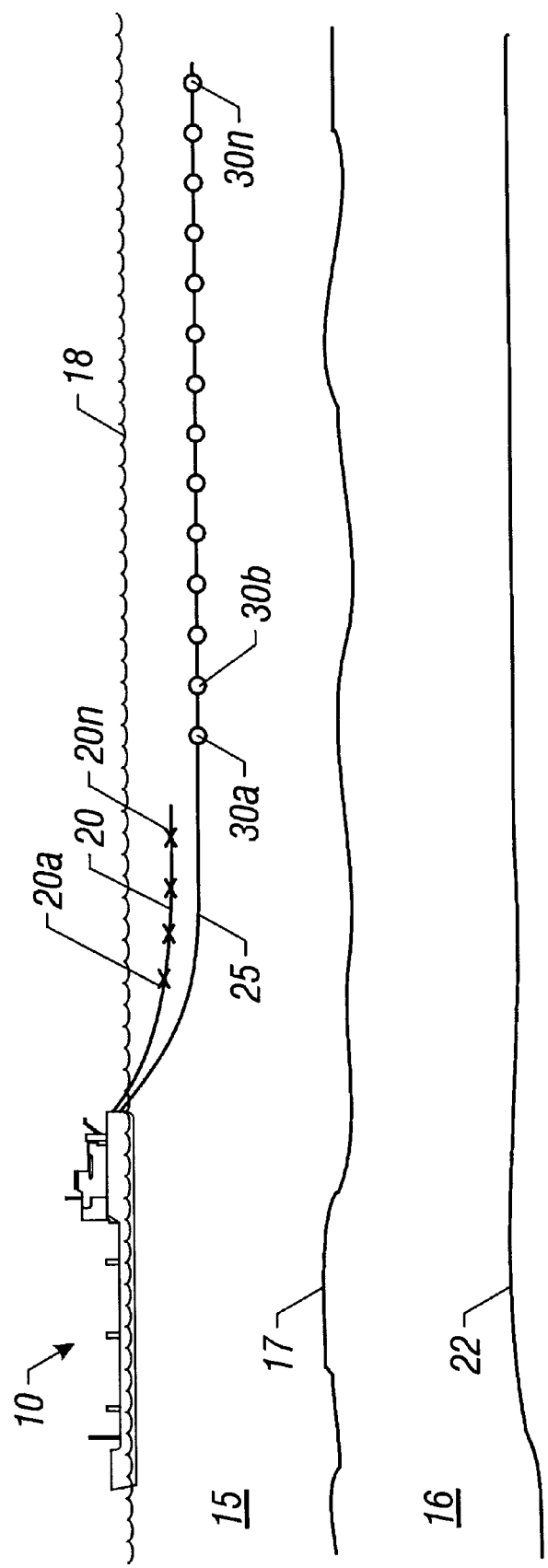
FIG. 1 depicts an exemplary seismic data acquisition system for use in a marine environment.

Referring now to FIG. 1, an example of portions of a marine seismic data acquisition system is illustrated. A vessel 10 on a body of water 15 overlying the earth 16 has deployed behind it a seismic source array 20 and a streamer cable 25. The seismic source array 20 is typically made up of individual air guns 20a, 20b, . . . 20n that are fired under the control a controller (not shown) aboard the vessel 10. Seismic pulses propagate into the earth and are reflected by a reflector 22 therein. For simplifying the illustration, only one reflector is shown: in reality, there would be numerous reflectors, each giving rise to a reflected pulse. After reflection, these pulses travel back to the surface where they are recorded by detectors (hydrophones) 30a, 30b, . . . 30n in the streamer cable. The depth of the source array and the streamer cable are controlled by auxiliary devices (not shown).

Figure 2:
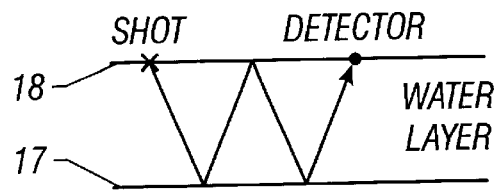
FIG. 2 depicts water bottom multiples.
Figure 3:
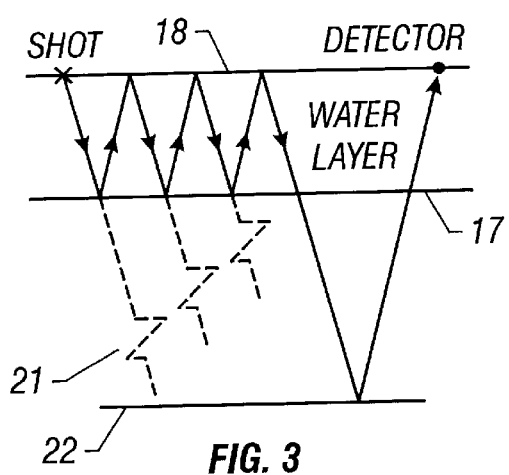
FIGS. 3 and 4 depict water reverberations.
Figure 4:
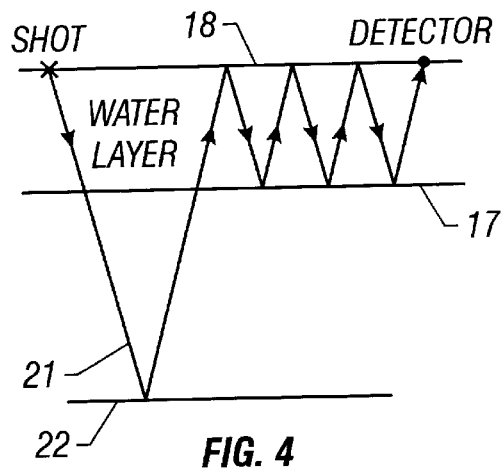

FIG. 2 shows water bottom multiple reflections traveling within the body of water that would also be detected by the detectors 30a, 30b, . . . 30n. FIGS. 3 and 4 show reverberations of reflected pulses from the earth caused by multiple reflections within the water layer.

Figure 5:
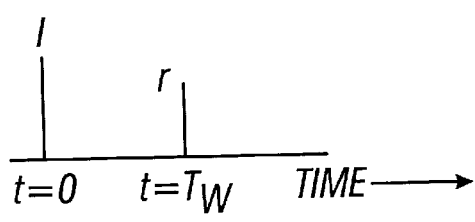
FIGS. 5–8 illustrate two- and three-point time domain inverse operators.
Figure 6:
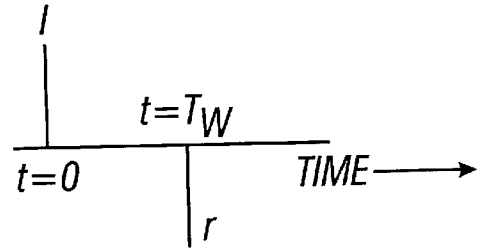
Figure 7:
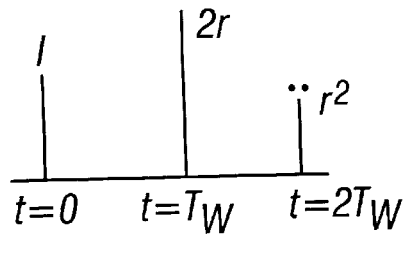
Figure 8:
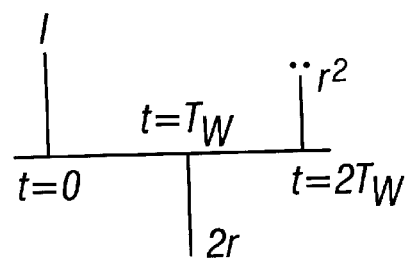

The seismic trace that is generated by a shot pulse may be described mathematically by equation (1). The distortion function introduced by a single reflection in the water layer is illustrated by FIGS. 5 and 6. The initial impulse at time 0 is followed by a pulse of amplitude r at a time $T_w$, where $T_w$ is the two way traveltime in the water for a seismic pulse and r is the water bottom reflectivity. This water bottom reflectivity can be either positive or negative, as shown in FIGS. 5 and 6.

The effect of this water bottom reflectivity combined with multiple reverberations in the water layer at is to introduce a reverberation function. In those circumstances wherein the water bottom is relatively flat, the downward-going reverberation distortion at the source, and the upward-going reverberation distortion at the detector are approximately the same. Consequently, for a flat water bottom, a total dereverberation operator can be represented by the convolution of the two-point operator at the source with the two-point operator at the detector. This is gives the so-called Backus operator given by equation (4).

The two way travel time in the water is easily obtainable by prior methods. One of the most accurate methods is to calculate it from the bathymetry since the velocity of sound in water is well known. Another method is to determine it from the arrival time of the water bottom reflection on the first detector 30a and calculating it from known values of the detector depth and the source depth below the water surface 18. However, the determination of the water bottom reflectivity is problematic. As noted above, the methods based upon the spectra or the autocorrelation of the recorded seismic trace are subject to error due to geologic sequences with the same time period as the two-way time in water. Direct determination from the amplitude of the water bottom reflection are difficult to make because in shallow water, the water bottom reflection may arrive in the same time window as a direct arrival through the water from the source to the detector.

Figure 9A:
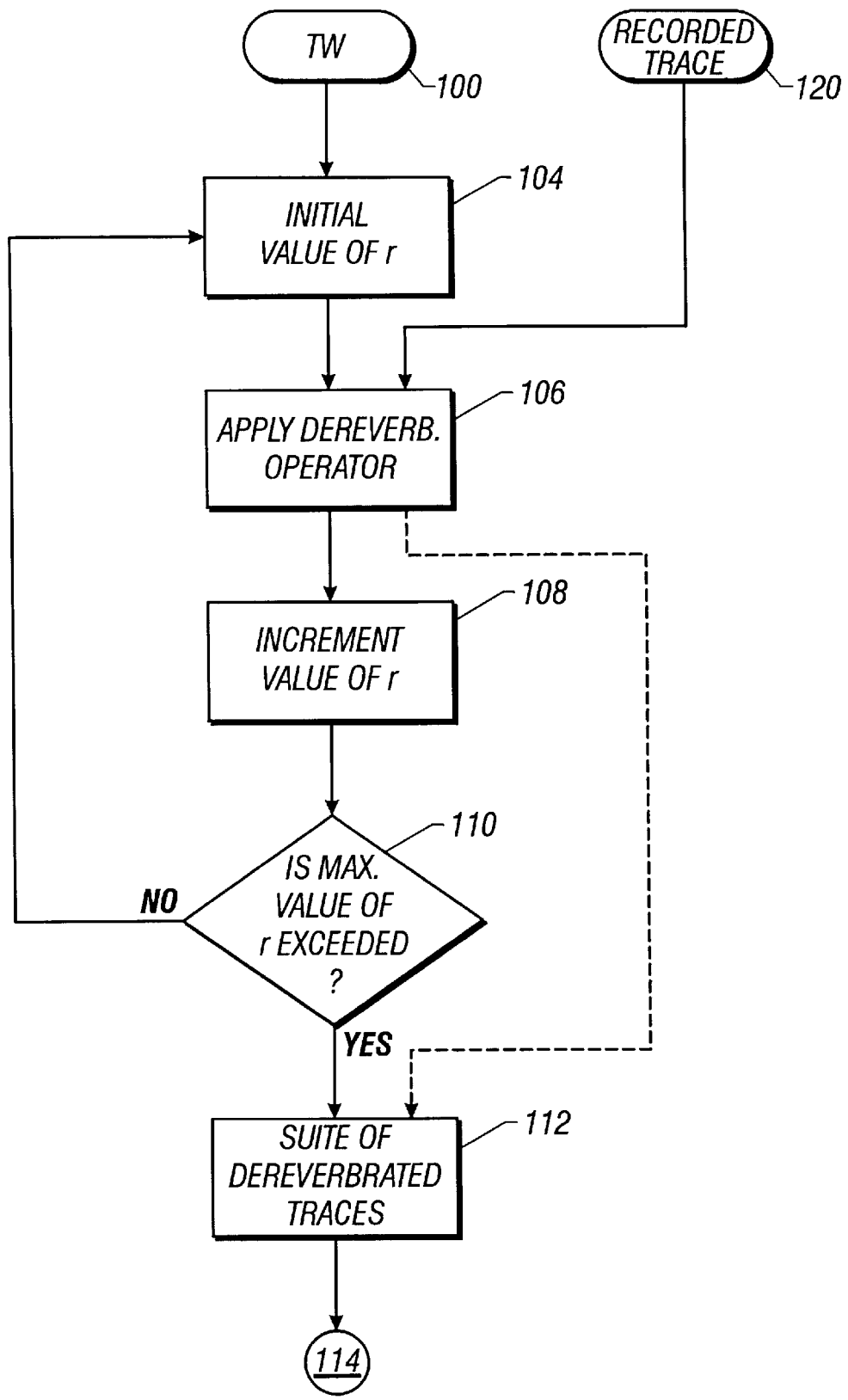
FIGS. 9A–9B illustrate steps of the present invention for determination of water bottom reflectivity.
Figure 9B:
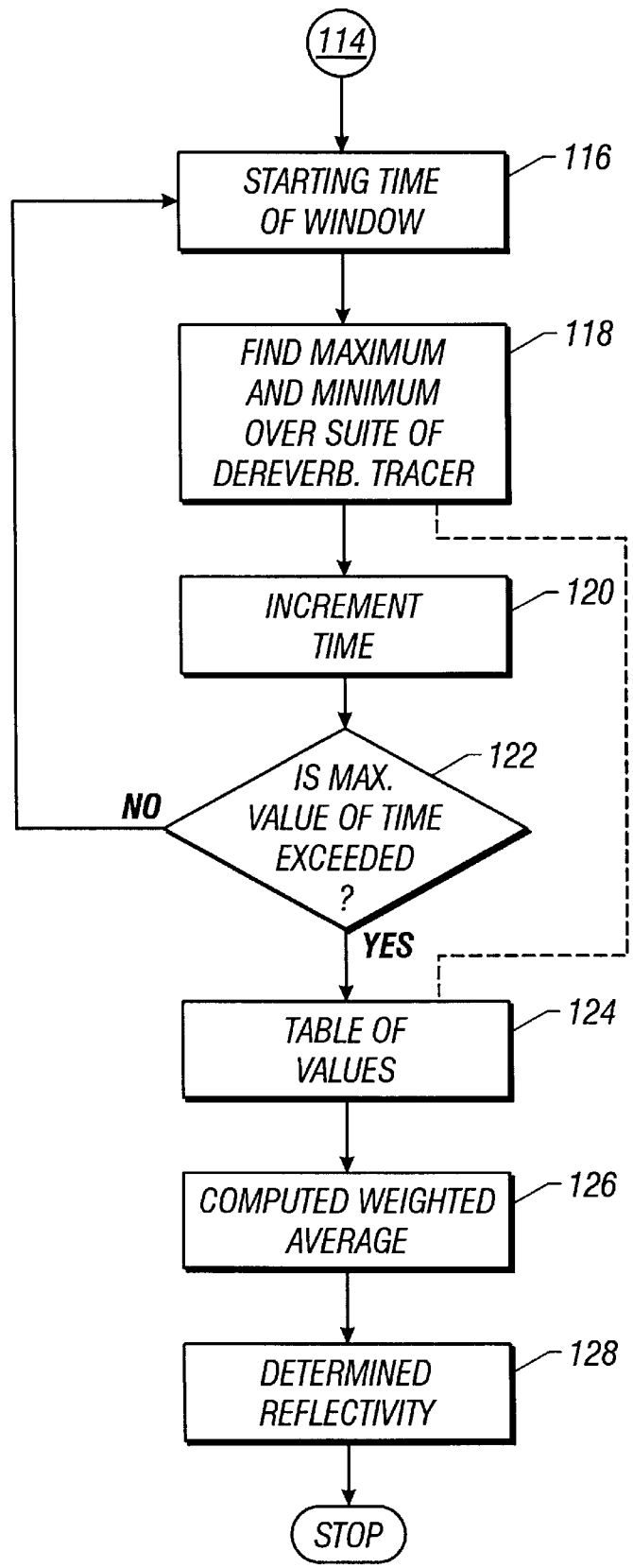

Turning now to FIGS. 9A–9B, a flow chart of the present invention is depicted for determination of the reflectivity of the water bottom. The method starts with a two way travel time $T_w$ in the water 100 and a recorded seismic trace 102. The recorded trace includes reflection pulses from reflectors below the water bottom and includes undesirable reverberations that are to be attenuated. This two way travel time is twice the travel time from the surface of the water to the water bottom. A range of possible values for the water bottom reflectivity r is chosen. In a preferred embodiment of the invention, the range of possible water bottom reflectivities is from −0.9 to +0.9. An initial value of the reflectivity is chosen 104 at the lower limit of the range of reflectivities. Using this initial value of reflectivity and the two way travel time in the water, a Backus operator given by equation 4 is applied to the recorded trace at 106. A filtered trace is saved 112 as part of a suite of filtered traces. The possible value of the reflectivity is increased by a quantity Δr 108 and a check is made to see if the possible value exceeds the upper limit of the range of possible reflectivities 110. In a preferred embodiment of the invention, the value of Δr is 0.01. If the test at 110 is negative, the process goes back to step 104 with the new value of possible reflectivity and steps 106–110 are repeated, each time saving a new dereverberated trace as part of a suite of dereverberated traces 112. If the test at 110 is negative, the iterative loop from 106–110 is terminated and the suite of filtered traces at 114 is used in subsequent steps illustrated in FIG. 9B.

A time window for analysis of the data is selected. As would be known to those versed in the art, the starting point of the window should not include initial water borne noises and other artifacts. At the starting time of the window 116, the entire suite of dereverberated traces is examined to find the minimum and maximum amplitude of the suite of filtered traces. The minimum and maximum are output to a stored table of values along with the possible reflectivity corresponding to the minimum absolute amplitude. This is the value of reflectivity that when used in a dereverberation operator has the largest reduction in trace amplitude.

The time for analysis, is incremented by a quantity $\Delta t$ 120. A check is made to see if the incremented time exceeds the maximum time of the analysis window 122. This maximum time of the analysis window may be chosen on the basis of one of many criteria. In one embodiment of the invention, the maximum time of the analysis window is based upon an adequate signal to noise ratio—clearly, it would be undesirable to select a derverberation operator derived on noise. Alternatively, the maximum time of analysis is based upon geologic considerations—in most exploration areas of interest, there would be a priori knowledge of an approximate travel time for the geologic interval of interest. The increment of the analysis time $\Delta t$ is chosen to be a multiple of the sampling time interval $\Delta T$ used for recording the data. In a preferred embodiment of the invention, they are equal, i.e., the analysis time increment is equal to the sampling time increment of the seismic data.

If the test at 122 is negative, the time of analysis is incremented and the steps from 116–122 are repeated. At each analysis time, the maximum and minimum absolute amplitudes of the suite of dereverberated traces and the possible reflectivity corresponding to the minimum absolute amplitude of the dereverberated traces is saved. Once the maximum time of analysis is exceeded, as indicated by a positive response at 122, analysis of the stored values 124 proceeds.

The analysis of the stored values is based upon the following rationale: Each of the stored values of possible reflectivity (one for each analysis time) is the value that reduces the amplitude of the dereverberated trace to a minimum. This is what a dereverberation operator should do if there are no reflected seismic pulses at the analysis time. However, if there is a seismic reflection pulse at the analysis time, reduction to a minimum value is inappropriate. The averaging over a range of analysis times is an averaging over different geologic reflected pulses and would therefore reduce the effect of geology on the determined reflectivity. However, instead of a simple averaging, the present invention weights the selected reflectivity by a factor dependent upon the range of reflectivity values of the suite of dereverberated traces: this means that a greater weight is given to a selected reflectivity that has a larger effect.

Those versed in the art would recognize that other weighting functions could also be used. Such variations would be known to those versed in the art and are intended to be within the scope of the present invention.

U.S. Pat. No. 5,524,100 issued to Paffenholz, the contents of which are fully incorporated here by reference, discloses an invention in which a dual sensor array deployed on the ocean bottom is used to determine the water bottom reflectivity. The duel sensor array comprises a vertical component geophone and a hydrophone. The reflectivity is determined by minimizing the power within a spectral band. The determined reflectivity is used to determine an upcoming wavefield that is free of reverberations. As discussed above, there will be contamination of the determined reflectivity by geology.

The water bottom reflectivity determined in the present invention and discussed above with reference to FIG. 9 may be used in conjunction with the disclosure in Paffenholz to determine an upcoming dereverberated wavefield that is not sensitive to geologic contamination of the reflectivity determination.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a reflectivity of a bottom of a body of water comprising:
    (a) firing at least one seismic source within the body of water to generate seismic pulses that propagate within the body of water and into earth thereunder;
    (b) recording at least one seismic trace indicative of seismic pulses reflected by seismic reflectors within the earth, said at least one seismic trace including reverberations within the body of water of seismic pulses reflected by the seismic reflectors;
    (c) obtaining a travel time from an upper surface of the body of water to the bottom of the body of water;
    (d) for each of a first plurality of possible reflectivities of the bottom of the body of water, obtaining a filtered trace from said travel time, said at least one seismic trace, and said possible reflectivity to give a first plurality of filtered traces;
    (e) for each of a second plurality of analysis times within a time window, determining a quality factor from values of the first plurality of filtered traces at each said analysis time to give a second plurality of quality factors; and
    (f) determining said reflectivity at the bottom of the body of water from said first plurality of filtered traces and said second plurality of quality factors.

2. The method of claim 1 wherein the at least one seismic source further comprises a plurality of seismic sources in an array.

3. The method of claim 1 wherein the recording of the at least one seismic trace is performed by using at least one of (i) a hydrophone in the water, (ii) a hydrophone at the bottom of the body of water, and (iii) a geophone at the bottom of the body of water.

4. The method of claim 1 wherein each of the first plurality of possible reflectivities lies between –0.9 to 0.9.

5. The method of claim 1 wherein the first plurality of dereverberated traces are obtained from the at least one seismic trace by a dereverberation operator of the form $1+2R\delta(T)+2R^2\delta(2T)$ where R is one of the first plurality of possible reflectivities, T is the obtained travel time, and $\delta$ is the Kronecker delta function.

6. The method of claim 1 wherein each of said quality factor is an absolute value of the difference between a maximum value of the first plurality of filtered traces at said sampling time and a minimum absolute value of the first plurality of filtered traces at said analysis time.

7. The method of claim 1 wherein determining said reflectivity further comprises:
    (i) determining a maximum of the filtered traces at each of the second plurality of analysis times to give a second plurality of selected reflectivities;
    (ii) determining a second plurality of weighting coefficients for the second plurality of selected reflectivities, each said weighting coefficient related to a range of values of the first plurality of filtered traces at each of said second plurality of analysis times; and (iii) determining the reflectivity as an average of the second plurality of selected reflectivities weighted by the corresponding weighting coefficient of the second plurality of weighting coefficients.

8. The method of claim 7 wherein the each of the second plurality of weighting coefficients is a difference between a maximum and a minimum of the first plurality of dereverberated traces at each of said second plurality of analysis times.

9. A method of seismic prospecting comprising:

(a) firing at least one seismic source within a body of water to generate seismic pulses that propagate within the body of water and into earth thereunder;

(b) recording at least one seismic trace indicative of seismic pulses reflected by seismic reflectors within the earth, said at least one seismic trace including reverberations of seismic pulses reflected by the seismic reflectors;

(c) obtaining a travel time from an upper surface of the body of water to a bottom of the body of water;

(d) for each of a first plurality of possible reflectivities of the bottom of the body of water, obtaining a filtered trace from said travel time, said at least one seismic trace, and said possible reflectivity to give a first plurality of filtered traces;

(e) for each of a second plurality of analysis times within a time window, determining a quality factor from values of the first plurality of filtered traces at each said analysis time to give a second plurality of quality factors;

(f) determining a reflectivity at the bottom of the body of water from said first plurality of filtered traces and said second plurality of quality factors; and (g) processing the at least one seismic trace using the determined reflectivity to give a processed seismic trace wherein the reverberations have been reduced.

10. The method of claim 9 wherein the at least one seismic source further comprises a plurality of seismic sources in an array.

11. The method of claim 9 wherein the recording of the at least one seismic trace is performed by using at least one of (i) a hydrophone in the water, (ii) a hydrophone at the bottom of the body of water, and (iii) a geophone at the bottom of the body of water.

12. The method of claim 9 wherein each of the second plurality of possible reflectivities lies between −0.9 to 0.9.

13. The method of claim 9 wherein the first plurality of dereverberated traces are obtained from the at least one seismic trace by a dereverberation operator of the form $1+2R\ \delta(T)+2\ R^2\ \delta(2T)$ where R is one of the first plurality of possible reflectivities, T is the obtained travel time, and $\delta$ is the Kronecker delta function.

14. The method of claim 9 wherein each of said quality factors is a difference between a maximum absolute value of the first plurality of filtered traces at said sampling time and a minimum absolute value of the first plurality of filtered traces at said analysis time.

15. The method of claim 1 wherein determining said reflectivity further comprises:

(i) determining a maximum of the filtered traces at each of the second plurality of analysis times to give a second plurality of selected reflectivities;

(ii) determining a second plurality of weighting coefficients for the second plurality of selected reflectivities, each said weighting coefficient related to a range of values of the first plurality of filtered traces at each of said second plurality of analysis times; and (iii) determining the reflectivity as an average of the second plurality of selected reflectivities weighted by the corresponding weighting coefficient of the second plurality of weighting coefficients.

16. The method of claim 15 wherein the weighting coefficient is the difference between a maximum and a minimum of the first plurality of dereverberated traces at each of said sampling times.

* * * * *